United States Patent [19]
DePetris et al.

[11] Patent Number: 5,302,445
[45] Date of Patent: * Apr. 12, 1994

[54] PROCESS FOR MAKING A REINFORCED FIBROUS MAT AND PRODUCT MADE THEREFROM

[75] Inventors: Robert DePetris, Chatsworth; William Reeve, Burlington, both of N.J.

[73] Assignee: Leucadia, Inc., La Jolla, Calif.

[ * ] Notice: The portion of the term of this patent subsequent to Oct. 13, 2009 has been disclaimed.

[21] Appl. No.: 748,674

[22] Filed: Aug. 22, 1991

[51] Int. Cl.$^5$ .............................. D04H 1/70
[52] U.S. Cl. .................... 428/283; 264/113; 264/118; 264/119; 264/122; 428/284; 428/288
[58] Field of Search ........... 264/113, 118, 119, 122, 264/115, 116, 121; 428/283, 284, 288

[56] References Cited

U.S. PATENT DOCUMENTS

| | | | |
|---|---|---|---|
| 2,543,101 | 2/1951 | Francis | 264/112 |
| 2,624,079 | 1/1953 | Duvall | 264/113 |
| 2,746,895 | 5/1956 | Duvall | 264/113 |
| 4,097,638 | 6/1978 | Videen | 428/213 |
| 4,141,772 | 2/1979 | Buell | 264/113 |
| 4,190,692 | 2/1980 | Larsen | 428/107 |
| 4,474,846 | 10/1984 | Doerer et al. | 428/284 |
| 4,612,224 | 9/1986 | Davis | 428/109 |
| 5,023,027 | 6/1991 | Nopper | 264/37 |

*Primary Examiner*—Mary Lynn Theisen
*Attorney, Agent, or Firm*—Lucas & Just

[57] ABSTRACT

A method for making a reinforced fibrous mat having a net layer between two fibrous layers and the reinforced fibrous mat made therefrom is disclosed. The net layer improves handleability of the fibrous mat. The fibrous mat may be used as is or it may be molded to form a molded product. A thermoplastic binder such as latex or starch is used in forming the fibrous layers. A thermoset binding agent such as a phenolic resin is added to the fibers if the reinforced fibrous mat is molded.

8 Claims, 2 Drawing Sheets

PROCESS FOR MAKING A REINFORCED FIBROUS MAT AND PRODUCT MADE THEREFROM

The present invention relates to a method for making a reinforced fibrous mat having a net layer between two fibrous layers and the product resulting therefrom. The net layer is of particular advantage in improving the handleability of the fibrous mat.

The fibrous mat made by the present process may be used for a variety of purposes, including acoustical and/or thermal insulation, to add structural integrity to an article filled with the fibrous mat, or as a sorbent. The fibrous mat may also be molded by application of heat and/or pressure to form a molded product.

It is known to combine fibrous materials with binding materials to produce a fibrous mat. Binding materials included in such products are thermoplastic binders such as starch or latex.

The problem in the past with fibrous mats has been that it is difficult to handle the mat before and during use. The mat tends to compress unevenly or sag during transportation, storage, or use. The mat can also deform before being molded. Especially where the mat is to be molded, it is important that the density remain constant throughout the mat and that no sagging or deformation occur.

Attempts have been made in the past to increase the handleability of the fibrous mat and decrease the amount of deformation which occurs before or during use of the mat. These attempts include stitching or needling the fibrous mat with reinforcing materials, and admixing additional reinforcing agents with the fibrous materials which make up the mat.

U.S. Pat. No. 4,612,224 teaches making a molded article from a reinforced fiber web which has a scrim sheet needled to the web. The reinforcement of the web is achieved only by the additional step of needling the reinforcing scrim to the web.

U.S. Pat. No. 4,474,846 teaches making a molded article by admixing thermoplastic carrier fibers with base fibers to form a blanket which is then molded. The carrier fibers are mechanically intertwined with each other and with the base fibers by special machinery. The binding is performed by the carrier fibers and/or a thermoplastic or chemical binding agent.

U.S. Pat. No. 4,097,638 discloses a reinforced, lightweight, flexible cloth. The cloth consists of a laminated structure of two pre-made layers of non-woven fabric with a net reinforcing layer sandwiched between them. The cloth is thin, i.e. not more than ¼ in. (about 0.6 cm.) thick, which is not suitable for the insulation and structural benefits achieved by using the thick fibrous mat of the present invention.

The present invention is an improvement over the prior art since it makes a reinforced fibrous mat without the need for any special machinery to bind the fibers with the reinforcing materials. Additionally, no needling or laminating step is necessary to reinforce the fibrous mat. The reinforced fibrous mat can be used for insulation, structural and/or sorption purposes, or it may be molded to form a molded article.

In accordance with the present invention, fibrous materials are mixed with a thermoplastic binding agent such as latex or starch. Latex or starch is preferably used if the fibrous mat is to be used without later molding; starch is preferably used if the fibrous mat is to be later molded. A lower layer of fibrous material and thermoplastic binding agent is air laid on a surface. A reinforcing net-like structure is applied on top of the lower layer. An upper layer of fibrous material and thermoplastic binding agent is air laid on top of the net-like structure. The layers of fibrous material and the net-like structure form the reinforced fibrous mat of the present invention, with the upper and lower layers being bonded together through interstices in the net-like structure.

If the reinforced fibrous mat is to be molded, a heat-curable thermoset binding agent such as a phenolic resin is also added to the fibrous materials, preferably before the thermoplastic binding agent is added. To mold the reinforced fibrous mat, the mat is dried to a suitable moisture content, cut to a suitable dimension,, and heat and/or pressure are applied to the mat to obtain a molded article with a desired end shape, see in general copending application Ser. No. 623,284 filed Dec. 5, 1990.

The fibrous material used in the present invention may be any suitable fibrous material such as wood fibers,, bleachboard, paper, textile waste fibers, or any combination thereof. Suitable wood fibers include yellow pine wood fibers. Suitable bleachboard and paper fibers include recycled paper packaging material and sulfite paper pulp. Suitable textile waste fibers include recycled thread waste. The fibrous materials may be from any suitable source; it is only necessary that the fibrous materials used be capable of forming a fibrous mat having a density of about 1 to about 5 lbs./ft$^3$ (about 16 to 90 kg/m$^3$). The size of the fibers is not critical so long as the fibers are able to form a fibrous mat by air laying.

The fibers are opened up in conventional manner to a low density, suitably about 1 lb./ft$^3$ (about 16 kg/m$^3$). Conventional means for opening up the fibrous materials include a hammermill or a waste pulling machine.

The fibers are sprayed with a thermoplastic binding agent in order to bind the fibers together and, after the fibrous layers are formed, to adhere the fibrous layers to the net laid between the layers and/or to adhere to the other fibrous layer through interstices in the net. The thermoplastic binding agent also assists in securing the heat-curable thermoset binding agent to the fibers when the thermoset agent is used.

When the reinforced fibrous mat of the present invention is used without later molding, a latex or a starch is the preferred thermoplastic binding agent.

Suitable latices include vinyl acetate monomers, vinyl acetate-acrylic acid copolymers, ethylene-vinyl acetate copolymers, and styrene butadiene polymers. Vinyl acetate monomer is the preferred latex for use in the present invention. A suitable vinyl acetate monomer is sold by H.P. Fuller as No. PD-062. Other materials such as cross-linking agents, viscosity modifiers, fire retardants, or anti-microbial or anti-bacterial agents may be added to the latex to make the latex more suitable for use in the present invention.

The vinyl acetate monomer latex as used in the present invention suitably has about 9 to about 13% solids content. It is preferred that the solids content be about 10 to about 12% and it is most preferred that it be 10.5 to about 11.5%.

The latex is preferably applied to the free-falling fibers while at ambient temperature.

When using starch as the thermoplastic binding agent, an aqueous starch solution with about 10% to about 20% starch solids content is preferred. It is more preferred that the starch solids content be about 11% to about 15% and it is most preferred that the solids content be about 14%. Good results have been obtained using corn starch.

Other materials such as starch enzymes, fire retardants, or anti-microbial or anti-bacterial agents may also be added to the starch solution.

The starch solution may be heated before addition to the fibers. It is preferred that the starch solution be at a temperature of about 185 F. (about 85 C.) when applied.

When the reinforced fibrous mat of the present invention is to be later molded, starch is the preferred thermoplastic binding agent. The starch used is the same as that starch solution used when the mat is not later molded.

When the reinforced fibrous mat of the present invention is to be later molded, the fibrous materials are admixed with a heat-curable thermoset binding agent such as a phenolic resin. It is preferred that the phenolic resin be applied in the form of dry particles. The admixture of the fibers with phenolic resin preferably occurs before the thermoplastic binding agent is added to the fibers. Any means of mixing the fibrous materials together with the heat-curable thermoset binding agent may be used so long as the thermoset agent is thoroughly mixed with the fibrous materials. Suitable mixing methods include mixing the fibers with the thermoset binding agent in a mixing chute, or spraying dry particles of the thermoset binding agent on the fibers as the fibers are in a free-fall state. The preferred method of mixing the thermoset binding agent with the fibers is to spray the fibers with the thermoset binding agent as the fibers are free-falling into a mixing chute. The fibers and the dry thermoset binding agent are then thoroughly admixed in the mixing chute.

Suitable heat-curable thermoset binding agents include phenol-formaldehyde resins, urea-formaldehyde resins, melamine-formaldehyde resins, and epoxy resins. The preferred heat-curable thermoset binding agent is a phenol-formaldehyde resin, commonly called a phenolic resin. Phenolic resins are produced by condensing phenol and formaldehyde in the presence of an alkaline catalyst. When excess formaldehyde is used, the resin can be cured and set with heat to the thermoset stage. As used herein, the term "phenol" is intended to include phenol, cresol, resorcinol and mixtures thereof which are conventionally condensed in alkaline medium with an excess of formaldehyde to form a heat-curable phenolic resin.

A suitable phenolic resin for use in the present invention is that sold under the tradename Durite by Borden, Inc. of Columbus, Ohio. A particularly suitable phenolic resin is that obtained from Borden under the name Durite 511A. Durite 511A comprises a phenol-formaldehyde copolymer, zinc stearate as a lubricating agent to assist in release of the molded product from the mold, and hexamethylenetetramine (1,3,5,7-tetraazatricyclo 3.3.1.13,7 decane) as a flowing agent.

Other ingredients may be added to or substituted for some of the phenol-formaldehyde copolymer of the phenolic resin. Such other ingredients include natural rosin, resin extenders such as Vinsol, or resin binders such as Gilsonite. Vinsol affects the flow characteristics of the resin and Gilsonite affects the cure rate of the resin. Other ingredients such as lubricants may also be added.

It is preferred that the phenolic resin be dry and of a fine particle size so that even distribution of the resin throughout the fibers occurs. Good results have been obtained using a dry resin which has a particle size where 98% of the particles pass through a 200 mesh screen.

Suitably, from about 54 to about 25% phenolic resin by weight of the fibers is added to the fibers. It is preferred to add about 10% to about 20% by weight and it is most preferred to add about 13% by weight.

The reinforcing net-like structures used in the reinforced fibrous mat of the present invention are suitably thermoplastic and are preferably flat, oriented polyolefin nets with strands which are integrally extruded at the joints. Flat net-like structures are preferred because there are no raised joints which may interfere with the securing of the net-like structure to the layers of fibrous materials or of the adherence of the layers to each other through the net-like structure.

It is more preferred that the net-like structure used in the present invention be a polyolefin square pattern net. Square pattern nets have been found to have better dimensional stability than diamond pattern nets. It is most preferred that the net be a biaxially oriented polypropylene square pattern net as taught, for example, in U.S. Pat. No. 4,190,692 and British Patent No. 905,252. The teachings of U.S. Pat. No. 4,190,692 are incorporated herein by reference. The strand count of the net must be such that there is enough contact between the layers of fibrous materials to allow the thermoplastic binding agent in the layers to bind the layers together. It is preferred that the strand count of the net be from about 2 to about 6 per in.$^2$ (about 0.3 to 1 cm$^2$) in each direction, and more preferably be about 3 to about 5 per in.$^2$ (about 0.5 to 0.8 cm$^2$) in each direction. It is preferred that the weight of the net be from about ½ to about 3 lbs./1000 ft.$^2$ (about 2.5 to 15 kg/m$^2$), and more preferred from about ¾ to about 2 lbs./1000 ft.$^2$ (about 4 to 10 kg/m$^2$).

The reinforced fibrous mat of the present invention is suitably made in a continuous operation on a moving belt. A lower layer of fibrous material with applied thermoplastic binding agent, and thermoset binding agent, if it is being used, is air laid on the belt. The net-like structure is applied on top of the first layer of fibrous material. An upper layer of fibrous material with applied thermoplastic binding agent, and thermoset being agent, if it is being used, is air laid on top of the net-like structure, forming the reinforced fibrous mat. The lower, and upper layers of fibrous materials are suitably formed of the same materials and are formed using substantially similar apparatus.

The present invention is more fully illustrated in the drawings wherein.

Figure 1:
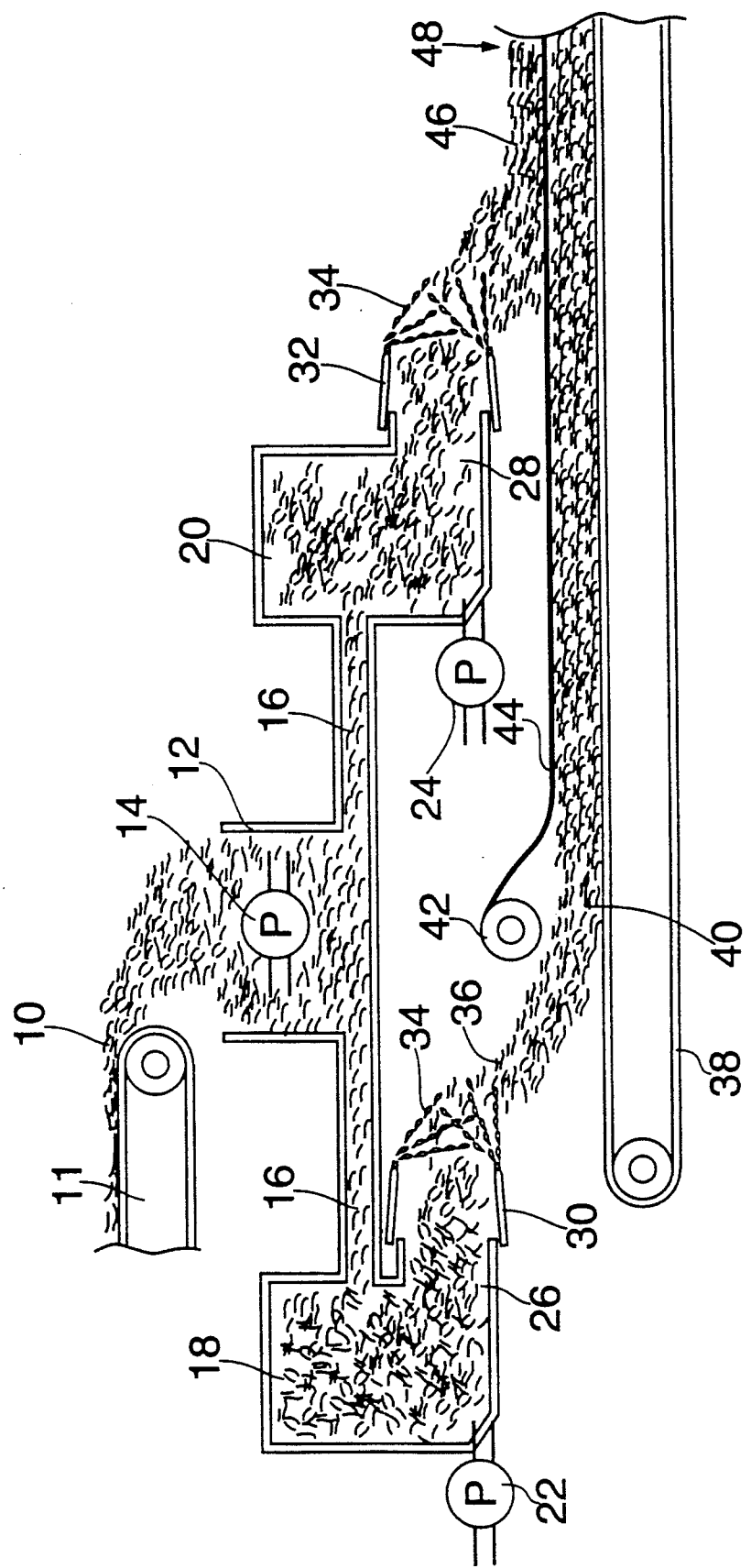
FIG. 1 shows an apparatus for making the reinforced fibrous mat when it is not to be later molded.

Referring to FIG. 1, fibers 10, which have been previously degraded and opened up in conventional manner, fall off belt 11 and are deposited into chute 12. Pump 14 supplies pressure to move fibers 10 from chute 12 through duct 16 into first ejection chamber 18 and second ejection chamber 20. Pump 22 supplies pressure to first ejection chamber 18 and pump 24 supplies pressure to second ejection chamber 20. The pumps 22 and 24 enable the fibers to be ejected from the ejection chamber under pressure. Ejection chambers 18 and 20 each have ejection nozzles 26 and 28, respectively. Surrounding each ejection nozzle 26, 28 is at least one spray nozzle 30, 32 for spraying thermoplastic binding agent 34 on fibers 10 as the fibers are ejected through ejection nozzles 26 and 28. The ejection pressure of the fibers is suitably about 500 cfm and the most preferred pressure is about 770 cfm. The thermoplastic binding agent is suitably sprayed on the fibers at a pressure of between about 50 and about 60 psi.

Ejection nozzles 26 and 28 of ejection chambers 18 and 20 are preferably circular with a plurality of thermoplastic binder-applying spray nozzles 30 and 32 positioned thereabout. Spray nozzles 30 and 32 are preferably angled inward towards the axis of the respective ejection nozzle to ensure thorough coating of the fibers with the thermoplastic binder. It is preferred to inwardly incline the spray nozzles at an angle of about 2 to about 10 as measured between the axes of the spray nozzle and the ejection nozzle and it is most preferred to have the spray nozzles at an angle of about 5 to about 7.

The fibers 10 are ejected from first ejection chamber 18 through ejection nozzle 26 and are sprayed with thermoplastic binding agent 34 through spray nozzle 30. The treated fibers 36 are air laid on moving belt 38, forming lower layer of fibrous material 40. Lower layer 40 is suitably about 1 to about 2 inches (about 2.5 to 5 cm.) thick and preferably about 1½ inch (about 3.8 cm) thick. Moving belt 38 moves lower layer 40 under net station 42 where a layer of net material 44 is applied on top of lower layer 40. A suitable means of applying net layer 44 is by unrolling the net material on top of the lower layer of fibrous material at the same velocity as the moving belt.

Lower layer of fibrous material 40 with its applied net layer 44 then passes under ejection nozzle 28 of second ejection chamber 20 which ejects thermoplastic-treated fibers 36 to form the upper layer of fibrous material 46 by air laying. Upper layer 46 is formed in the same manner as lower layer 40, i.e. degraded fibers 10 are ejected from second ejection chamber 20 through ejection nozzle 28. While being ejected, fibers 10 are sprayed with thermoplastic binding agent 34 through spray nozzle 32.

Lower and upper layers of fibrous material, 40 and 46, with the net layer 44 therebetween, form the reinforced fibrous mat 48 of the present invention. The lower and upper layers of fibrous material are in contact with each other through interstices in the net layer.

The presence of the net layer between the layers of fibrous materials leads to increased handleability of the resultant reinforced fibrous mat. The reinforced fibrous mat of the present invention has a lower degree of sagging during transport. The proper shape and consistency of the reinforced fibrous mat are retained because of the presence of the net layer, leading to a lower degree of deformation before and during use of the reinforced mat.

Upper layer of fibrous material 46 is preferably of the same thickness, composition, and density of the lower layer of fibrous material. However, variations in the upper layer of fibrous material may be introduced depending on the desired characteristics of the end product. For example, the upper layer of fibrous material may be of a different thickness or color, or have a different fiber composition so that the fibrous mat is preferentially sorbent on one side over the other side.

The reinforced fibrous mat has a density of about 1 to about 5 lbs./ft.$^3$ (about 16 to 90 kg/m$^3$) and preferably the density is between about 2 and about 3 lbs./ft.$^3$ (about 32 to 48 kg/m$^3$).

Figure 2:
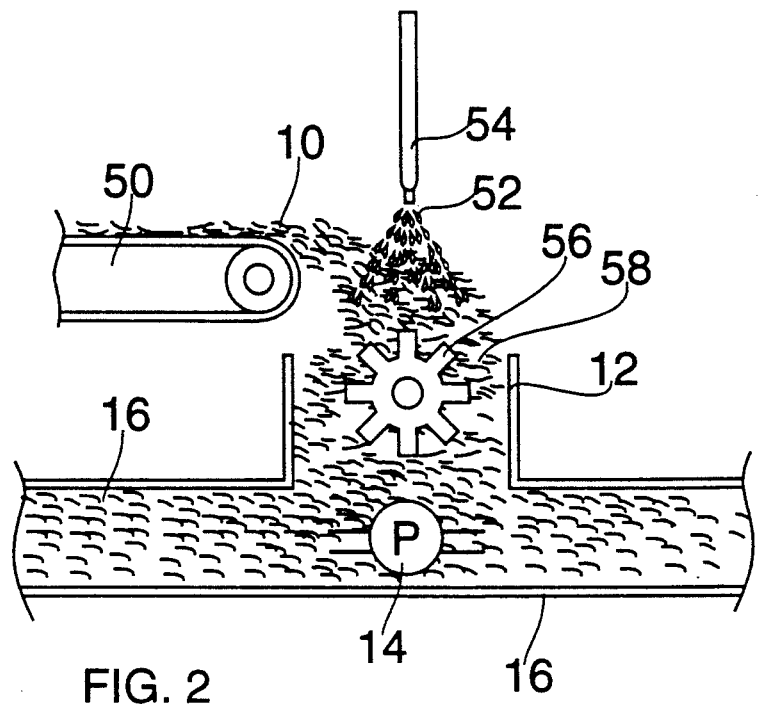
FIG. 2 shows a portion of the apparatus of FIG. 1 illustrating the embodiment when the reinforced fibrous mat is to be later molded.

As shown in FIG. 2, a slightly different method and apparatus is used in the present invention wherein the mat is molded to form a molded product.

Degraded fibers 10 are put in free-fall by falling from belt 50. As fibers 10 fall, particles of thermoset binding agent 52 are sprayed on the fibers through thermoset spray nozzle 54. The fibers/thermoset particle admixture 58 falls into chute 12 which is equipped with a paddle 56. The fibers/thermoset particle admixture 58 is thoroughly mixed in chute 12.

It is preferred to use dry particles of thermoset agent and to add the particles to the fibers by dry spraying it into the free-falling fibers from downwardly extending spray nozzles at a pressure of at least about 25 to about 30 lb./in.$^2$ (about 2 kg/cm$^2$). The fibers and the heat-curable thermoset binding agent should be thoroughly admixed together before the fibers are ejected through the ejection nozzles and sprayed with the thermoplastic binding agent.

After addition of the heat-curable thermoset binding agent, the thermoplastic binding agent is added to the fibers/thermoset admixture, the lower and upper layers of fibrous material are formed, and the net layer is placed between the layers as described above in connection with FIG. 1. After formation of the reinforced fibrous mat, the mat is dried to a lower moisture content in a conventional dryer. It is preferred that the moisture content of the mat before molding be less than about 5%. The drying is done in conventional manner, preferably at a temperature lower than the cure temperature of the heat-curable thermoset binding agent so that all of the thermoset agent is available for use in the molding operation.

Figure 3:
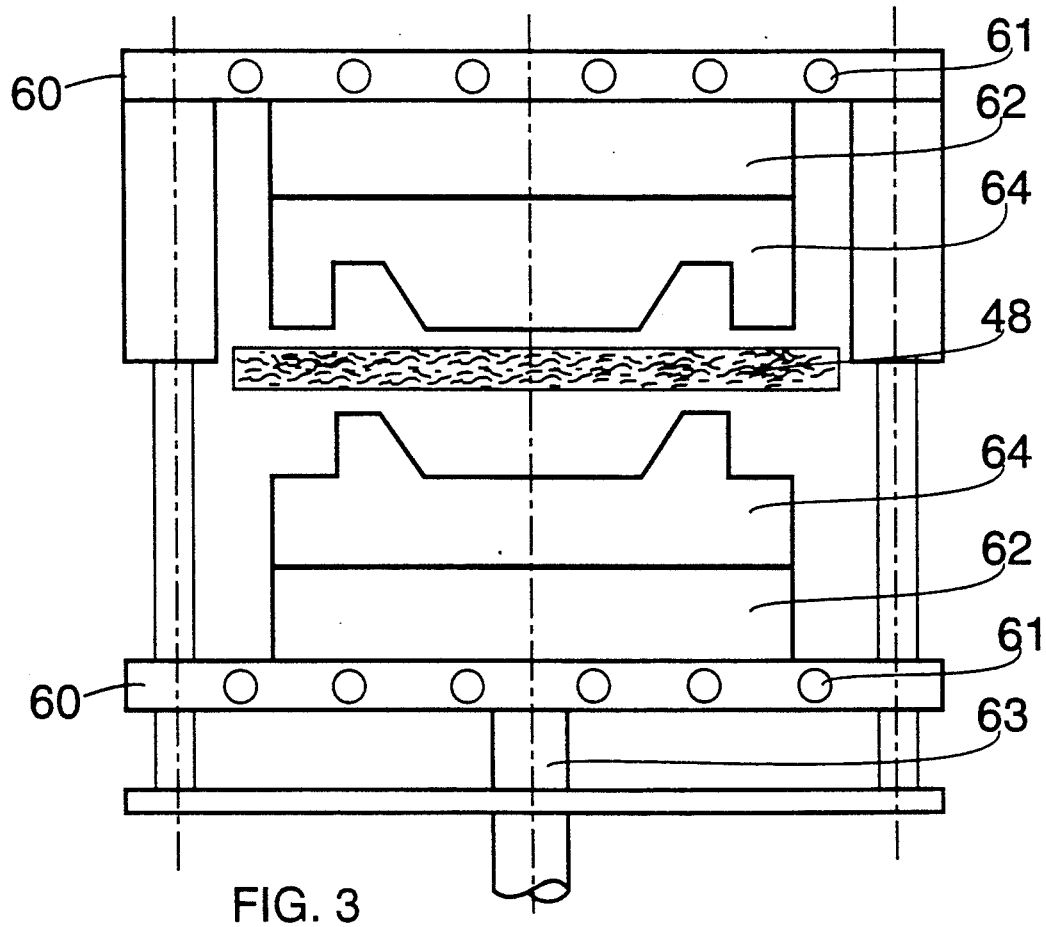
FIG. 3 shows a suitable molding apparatus for molding the reinforced fibrous mat.

FIG. 3 illustrates a typical apparatus for molding the reinforced fibrous mat of the present invention to form a molded product.

After the reinforced fibrous mat is dried and cut, it is transferred to mold press 60. Mold press 60 has top and bottom mold plates 62, each having top and bottom dies 64. Dies 64 conform to the desired end shape of the molded product. Mold press 60 also has heating means 61 to heat mold plates 62 and hydraulic means 63 to move mold plates 62 together under pressure. Mold plates 62 apply heat and pressure to reinforced fibrous mat 48 to form a molded product.

The molded product is molded in conventional manner at a sufficient pressure, temperature and time for the heat-curable thermoset binding agent to cure and set the molded product. The molding parameters will vary depending on the particular heat-curable thermoset binding agent used, the fiber content, thickness, and moisture content of the reinforced fibrous mat, and the die gap between the mold plates. Generally the mat is molded at about 350°–400° F. (about 175°–200° C.) for up to about 3 minutes at a pressure of about 500 to 4000 psi (about 35 to 280 kg/cm$^2$). When using wood fibers, Durite 511A as the heat-curable thermoset binding agent at a 13% level, a reinforced fibrous mat about 3 inches (about 8 cm) thick and having a moisture content of about 5%, the molded product is made by molding the mat at about 350–400 F. (about 175–200 C.) for about 45 seconds at about 3000 psi (about 200 kg/cm$^2$).

While the density of the molded product may be as high as desired, it is generally at least two times and possibly up to about 30 times the density of the reinforced fibrous mat. The molded product may be formed having different densities over its structure, e.g. some portions may be 60 lbs./ft.$^3$ (about 960 kg/m$^3$) and some may be 40 lbs./ft.$^3$ (about 640 kg/m$^3$). The variations of the densities of the molded product may be obtained by varying the density of the mat or by adjusting the gap between the dies of the mold plates. When a lesser density is desired, a larger die gap is used. The pressure, temperature and time of the molding operation remain the same as for making a product with uniform density.

The molded product may be planar or three-dimensional. The term "three-dimensional" as used herein means that the product has concavities and/or raised areas. Molded products of the present invention are applicable for use as or in a variety of items including, for example, decorative trim panels, automotive headliners, door panels, instrument panels, center trim pillars, package trays, consoles, furniture, luggage, building materials, packaging and the like.

These and other aspects of the present invention may be more fully understood with reference to the following examples.

EXAMPLE 1

A reinforced fibrous mat was made in accordance with the present invention using recycled textile thread waste and starch as the thermoplastic binding agent.

Thread waste fibers were degraded in a hammermill to a density of about 1 lb./ft.$^3$ (16 kg/m$^3$). The fibers were dispersed through a dispersion nozzle at a pressure of about 766 cfm to fall onto a moving belt. The belt transferred the fibers to a chute which was connected to two ejection chambers.

The fibers were ejected through ejection nozzles from both ejection chambers at a pressure of 766 cfm. A starch solution comprising the following ingredients was sprayed onto the fibers as they were ejected:

| Ingredients | % by weight |
|---|---|
| Corn starch | 9.85 |
| Alphamase | 0.002 |
| Dearcide 702 | 0.04 |
| Ammonium Sulphate | 4.9 |
| Water | q.v. |

The corn starch was 550B obtained from Clinton Corn Starch Company. Alphamase is a conventional starch enzyme. Dearcide 702 is a fungicide obtained from ChemTreat, Inc. Ammonium sulphate was added as a fire retardant.

The starch solution was made by first mixing the corn starch, alphamase and Dearcide with enough water to make a solution of 11% solids content. This solution was added to a blend tank. The ammonium sulphate was sifted slowly into the solution in the blend tank under agitation until completely dissolved. While agitating, the rest of the water was added. The final solids contents of the starch solution was 14%. The solution was heated to gelatinize the starch and was then applied to the fibers in the heated form.

The starch solution was sprayed out of spray nozzles surrounding the ejection nozzles at a pressure of 55 psi. The spray nozzles were inclined inwardly towards the center axis of the ejection nozzle at an angle of about 5 to 7 as measured between the axes of the ejection nozzle and the spray nozzle.

The treated fibers fell from the first ejection nozzle onto a moving belt and formed the lower layer of fibrous material by gravity deposition. The lower layer was 1.25 inches (3.1 cm) thick and about 140 inches (350 cm) wide with a density of about 2.5 lbs/ft$^3$. The moisture content was about 30%.

The moving belt moved the lower layer of fibrous material so that the net layer was applied on top of the lower layer. The net was a biaxially oriented square pattern polypropylene net having a strand count of 0.75×0.75 in.

The reinforced fibrous mat made from the lower and upper layers of fibrous material and the net layer inbetween was 2.50 inches (6.2 cm) thick and had a density of 2.5 lbs./ft.$^3$.

After the net layer was applied to the lower layer of fibrous material, the moving belt moved the lower layer under the second ejection nozzle so that the upper layer of fibrous material was formed. The upper layer was formed in the same manner as the lower layer and had the same physical characteristics.

EXAMPLE 2

A reinforced fibrous mat was made according to Example 1 except that latex was used as the thermoplastic binding agent. The latex was H.P. Fuller PD062 with a solids content of about 11%.

EXAMPLE 3

A reinforced fibrous mat was made according to the present invention and the mat was later molded. The reinforced fibrous mat was made using yellow pine wood fibers, Durite 511A as the heat-fusible thermoset binding agent and an aqueous corn starch solution as the thermoplastic binding agent.

Yellow pine fibers were degraded in a hammermill to a density of about 1 lb./ft.$^3$ (16 kg/m$^3$). The wood fibers were dispersed through a dispersion nozzle at a pressure of about 766 cfm to fall onto a moving belt. The belt transferred the fibers to a mixing chute having an impeller therein which rotated at about 3400 rpm. The mixing chute was connected to two ejection chambers. As the fibers fell into the mixing chute, the falling fibers passed under a series of 8 spray nozzles which sprayed dry Durite 511A particles onto the fibers.

The Durite 511A had the following composition:

| Ingredients | % by weight |
|---|---|
| Phenol-formaldeyde copolymer | 90 |
| Zinc Stearate | 1 |
| Hexamethylenetriamine | 9 |

16% Durite 511A by weight of the fibers was sprayed onto the fibers.

These fibers and Durite 511A were thoroughly admixed together and then the admixture was moved under pressure from the mixing chute to the ejection chambers. The fibers were ejected through the ejection nozzles from both ejection chambers at a pressure of 766 cfm. A starch solution made as disclosed in Example 1 was used. The starch was sprayed out of spray nozzles surrounding the ejection nozzles at a pressure of 55 psi. The spray nozzles were the same as those used in Example 1.

The reinforced fibrous mat used in this example was formed in the same manner as the mat of Example 1.

The moving belt transferred the reinforced fibrous mat to a dryer where it was dried at a temperature of about 225 F. (about 107 C.) for 6½ minutes. After drying, the moisture content of the mat was less than 5%.

The reinforced fibrous mat was cut to a preliminary molding size and was molded in a conventional compression molding machine. The molding was done at a temperature of 400 F. (about 204 C.), a pressure of 3,000 psi and for a time of 45 seconds.

The Physical properties of the finished molded product were measured and were found to be as follows:

Density: 53–114 lbs./ft.$^3$

Modulus of rupture: $13.1–26.5 \times 10^4$ psi

EXAMPLE 4

Example 1 is repeated except that no net is placed between the fibrous layers. The fibrous mat without the net is characterized by poor handleability and a tendency to sag and separate when being handled.

It will be understood that the claims are intended to cover all changes and modifications of the preferred embodiments of the invention herein chosen for the purpose of illustration which do not constitute a departure from the spirit and scope of the invention.

What is claimed is:

1. A method of making a molded product from a reinforced fibrous mat comprising:
   (a) admixing fibrous material with a heat-curable thermoset binding agent to form a fiber/thermoset admixture, said thermoset binding agent being a phenolic resin;
   (b) ejecting a first portion of said admixture from a first ejection nozzle and, as it is ejected, spraying said admixture with a thermoplastic binding agent to form a first sprayed admixture, said thermoplastic binding agent being an aqueous starch solution;
   (c) allowing said first sprayed admixture to free fall onto a substrate, thereby forming a first layer of fibrous material;
   (d) applying a net-like structure on top of said first layer of fibrous material;
   (e) ejecting a second portion of said admixture from a second ejection nozzle and, as it is ejected, spraying said admixture with a thermoplastic binding agent to form a second sprayed admixture, said thermoplastic binding agent being an aqueous starch solution;
   (f) allowing said second sprayed admixture to free fall onto said net-like structure to form a second layer of fibrous material, said first and second layers of fibrous materials being in contact with and bonded to each other through interstices in said net-like structure;
   (g) said first layer of fibrous material, said net-like structure, and said second layer of fibrous material forming said reinforced fibrous mat;
   (h) drying said reinforced fibrous mat to a moisture content of less than about 5%;
   (i) cutting said reinforced fibrous mat to a desired size; and
   (j) applying heat and pressure to the cut, reinforced fibrous mat of step (i) to form a molded product.

2. The method of claim 1 wherein said fibrous materials are selected from the group consisting of wood, bleachboard, paper, textile waste fibers, and combinations thereof.

3. The method of claim 1 wherein said net-like structure is a biaxially oriented polypropylene net having a strand count of about 2 to about 6 per square inch in each direction.

4. A molded product made in accordance with the method of claim 1.

5. A method of making a molded product from a reinforced fibrous mat comprising:
   (a) spraying an admixture of fibrous material and a heat-curable thermoset binding agent with a thermoplastic binding agent to form a first sprayed admixture;
   (b) forming a first layer of fibrous material from said first sprayed admixture;
   (c) applying a net-like structure on top of said first layer of fibrous material;
   (d) spraying a second admixture of fibrous material and a heat-curable thermoset binding agent with a thermoplastic binding agent to form a second sprayed admixture;
   (e) forming a second layer of fibrous material on top of said net-like structure from said second sprayed admixture, said first and second layers of fibrous materials being in contact with and bonded each other through interstices in said net-like structure;
   (f) said first layer of fibrous material, said net layer, and said second layer of fibrous material forming said reinforced fibrous mat;
   (g) drying said reinforced fibrous mat to a moisture content of less than about 5%;
   (h) cutting said reinforced fibrous mat to a desired size; and
   (i) applying heat and pressure to the cut reinforced fibrous mat of step (h) to form a molded product.

6. The method of claim 5 wherein, in each of steps (a) and (d), said thermoplastic binding agent is applied to said admixture by ejecting said admixture through an ejection nozzle and, as it is ejected, spraying said admixture with said thermoplastic binding agent.

7. The method of claim 5 wherein said fibrous materials are selected from the group consisting of wood, bleachboard, paper, textile waste fibers, and combinations thereof and said thermoplastic binding agent is an aqueous starch solution.

8. The method of claim 5 wherein said net-like structure is a biaxially oriented polypropylene net having a strand count of about 2 to about 6 per square inch in each direction.

* * * * *